United States Patent
Igeta et al.

(10) Patent No.: US 6,434,293 B1
(45) Date of Patent: Aug. 13, 2002

(54) ROTARY LIGHT COUPLER

(75) Inventors: Kenichiro Igeta; Hiroshi Hagino, both of Yoni (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 09/627,426

(22) Filed: Jul. 27, 2000

(30) Foreign Application Priority Data

Jul. 27, 1999 (JP) .......................................... 11-212034

(51) Int. Cl.[7] .............................. G02B 6/26; G02B 6/42
(52) U.S. Cl. .......................................... 385/25; 385/26
(58) Field of Search ..................................... 385/25, 26

(56) References Cited

U.S. PATENT DOCUMENTS

| | | | | |
|---|---|---|---|---|
| 4,401,360 A | * | 8/1983 | Streckmann et al. | 385/26 |
| 5,553,176 A | * | 9/1996 | DeMarco, Jr. | 385/26 |
| 6,030,103 A | * | 2/2000 | Gampe et al. | 362/404 |
| 6,190,020 B1 | * | 2/2000 | Hartley | 362/184 |
| 6,243,240 B1 | * | 6/2001 | Ozue et al. | 360/281.4 |

FOREIGN PATENT DOCUMENTS

JP 897597 12/1996

* cited by examiner

*Primary Examiner*—Hemang Sanghavi
*Assistant Examiner*—Scott Knauss
(74) *Attorney, Agent, or Firm*—Birch, Stewart, Kolasch & Birch LLP

(57) ABSTRACT

A rotary light coupler comprises a first light emitter and a first light receiver mounted on a fixed body, and a second light emitter and a second light receiver mounted on a rotary body. The first and the second light emitters are arranged to transmit light beams containing signals to the second and the first light receivers respectively, through a rotary mechanism. The first and the second light receivers are placed opposing each other along the direction of the axis of rotation of the rotary body. The first and the second light emitters are placed respectively at the radially outside of the first and the second light receivers. Light axes of the first and the second light emitters are set in such a manner that they direct toward the central portions of the second and the first light receivers respectively and that reflected lights from the second and the first light receivers do not come into the first and the second light receivers respectively. A set of the first light receiver and the first light emitter and a set of the second light receiver and the second light emitter are disposed in such a manner that they do not mechanically interfere with each other when they rotate relatively with each other.

9 Claims, 3 Drawing Sheets

ROTARY LIGHT COUPLER

BACKGROUND OF THE INVENTION

1. Field of the Invention

This invention relates to a device for transmitting signals from a fixed body to a rotary body, or from a rotary body to a fixed body, through a rotary mechanism. More specifically, this invention relates to a rotary light coupler which is capable of transmitting the signals without contact with the object to which the signals are to be transmitted, through a rotary mechanism, using an optical communication device to improve the reliability of the transmission.

2. Description of the Prior Art

In an apparatus having a rotary part such as an arm of a robot, a rotary head of an electronic parts mounting apparatus or a functional part of a game machine, an actuator (an electric motor in most cases) and its control device are usually mounted in the rotary part. In such cases, it is necessary to supply power from a fixed body that is the main body of the apparatus, into a rotary body that is the rotary part of the apparatus. It is also necessary to transmit control signals from the fixed body to the rotary body, or from the rotary body to the fixed body in a certain case. Such supplying of power and transmitting and receiving of signals are required to be made through a rotary mechanism. A brush and slip ring that contact with each other (contact type device) have been used in general for supplying power or transmitting and receiving signals.

In a contact type device in which a brush and a slip ring are used for supplying power or for transmitting and receiving signals, through a rotary mechanism, problems often occur with regard to the quality of the signal transmission and receiving and with regard to the durability of the devices. Further, in case that a large number of actuators or control devices are mounted on a rotary body, and that their respective control signals are transmitted in parallel, the number of slip rings increases. As a result, the signal transmission and receiving device becomes bulky, complicated and expensive. These control signals may be transformed into serial signals to be transmitted in a serial communication through a slip ring, or a pair of slip rings disposed in parallel for higher reliability of transmission. In such a serial communication, however, the communication becomes more susceptible to noises generated at the slip ring or slip rings, particularly when the communication speed becomes higher. In general, the noises increase with the amount of time the slip ring is used. Accordingly, life span of the slip ring with regard to noise emission as well as wear by friction is a matter to be fully considered. Since power supply devices are less susceptible to noises comparing with signal transmission and receiving devices, brushes and slip rings may still be used in the power supply devices in various fields. Accordingly, it is desired to realize signal transmission through a rotary mechanism with a non-contact type transmission and receiving device without using a brush and a slip ring. In any case, contact type transmission and. receiving devices will become useless sooner or later, since the rotation speed is going to be faster and the wearing of the devices will become a fatal problem. It will also become necessary to make power supply devices non-contact type.

A non-contact type power supply device and signal transmission and receiving device are disclosed, for example, in a publication, Japanese Unexamined Patent Publication (Kokai) No. 8-97597, "AN ELECTRONIC PARTS MOUNTING APPARATUS". In the publication, a non-contact type power supply device comprising a rotary transformer utilizing DC—DC converter and a non-contact type signal transmission device comprising a rotary transformer utilizing high frequency modulation are disclosed. Further, it is mentioned in the publication that the non-contact type signal transmission device can be replaced by an optical communication device, however, no embodiment for the optical communication device is disclosed.

A non-contact type signal transmission device utilizing a rotary transformer, such as disclosed in Japanese Unexamined Patent Publication (Kokai) No. 8-97597, is being used generally in a rotary head of a VTR set. Signal transmission performance of a rotary transformer is influenced greatly by a gap of the transformer. That is, it is necessary to make the gap of the transformer as narrow as possible to obtain the rotary transformer of an excellent performance. If the rotary transformer is an axial-gap type transformer, then axial run out of an end surface of a core of the transformer is required to be suppressed within a minimum value. If the rotary transformer is a radial-gap type transformer, then radial run out of a core of the transformer is required to be suppressed within a minimum value. As a result, high accuracy is required for manufacturing and assembling such rotary transformers, which makes these rotary transformers very expensive.

A rotary transformer may be adopted as a power supply device in place of brushes and slip rings to make a power supply device non-contact type. In this case, leakage of magnetic flux increases with the increase of power to be transmitted. Accordingly, a rotary transformer for signal transmission and receiving device disposed close to the rotary transformer for power supply device need to be shielded from the magnetic flux, which also makes the signal transmission device expensive. In these cases, a signal transmission and receiving device utilizing an optical communication device is more preferable, since an optical communication device is less susceptible to the magnetic field caused by the power supply device.

Conventional optical communication device that can be used as a bi-directional (transmission and receiving) communication device in a rotary mechanism has, in general, a complicated optical system comprising lenses, mirrors and/or prisms.

SUMMARY OF THE INVENTION

It is an object of the present invention to provide a rotary light coupler for a signal transmission and receiving, utilizing an optical communication device, through a rotary mechanism.

It is a more specific object of the present invention to provide a rotary light coupler, having very simple structure without using complicated and expensive optical system, for a bi-directional non-contact type signal transmission and receiving device.

In order to accomplish the above objects, the present invention provides a rotary light coupler comprising a first light emitter and a first light receiver mounted on a fixed body, and a second light emitter and a second light receiver mounted on a rotary body, in which the first light emitter is arranged to transmit light beam containing signals to the second light receiver through a rotary mechanism, the second light emitter is arranged to transmit light beam containing signals to the first light receiver through the rotary mechanism, the first light receiver and the second light receiver are placed opposing each other along the direction of the axis of rotation of the rotary body, the first light emitter and the second light emitter are placed respectively at the radially outside of the first light receiver and the second light receiver, a light axis of the first light emitter is set in such a manner that it is directed toward the central portion of the second light receiver and that a reflected light from the second light receiver does not enter into the first light receiver, a light axis of the second light emitter is set in such a manner that it is directed toward the central portion of the first light receiver and that a reflected light from the first light receiver does not enter into the second light receiver, and a set of the first light receiver and the first light emitter and a set of the second light receiver and the second light emitter are disposed in such a manner that they do not mechanically interfere with each other when they rotate relatively with each other.

Preferably, a light emitter with a narrow light spread angle is used for the first or the second light emitters, so that the light beam transmitted by the first light emitter does not come into the first light receiver, and that the light beam transmitted by the second light emitter does not come into the second light receiver.

If necessary, side surfaces of the first light emitter and the second light emitter are covered with covers formed of a light shielding material, to narrow down the light beams emitting from the first light emitter and the second light emitter to make the light beams direct only to their respective directions to which the light beams are to be directed.

Further if necessary, the first light emitter and the first light receiver are placed in a first case defining positions and orientations of the first light emitter and the first light receiver, and the second light emitter and the second light receiver are placed in a second case defining positions and orientations of the second light emitter and the second light receiver, then the first case and the second case are placed to oppose each other.

Preferably, the first case and the second case are formed of a light shielding material to suppress unnecessary lights emitting from the first light emitter and the second light emitter, and to suppress unnecessary lights entering into the first light receiver and the second light receiver.

A rotary power supply apparatus with rotary light coupler for signal transmission and receiving can be obtained by attaching the rotary light coupler in accordance with the present invention to an end portion of a shaft on which slip rings for power supply are provided.

Another rotary power supply apparatus with rotary light coupler for signal transmission and receiving can be obtained by attaching the rotary light coupler in accordance with the present invention to an end portion of a shaft on which a rotary transformer for non-contact power supply is provided.

According to the present invention, the set of the first light receiver and the first light emitter and the set of the second light receiver and the second light emitter can rotate relatively without mechanically interfering with each other. The light axes of the light emitters are directed toward the central portions of the respective light receivers to which the light beams are to be directed, and these light beams can be transmitted to the respective light receivers even when the light beams cross each other. Thus, a non-contact type bi-directional transmission can be performed using an optical system of very simple structure, without using a complicated optical system comprising lenses, mirrors, prisms and/or the like.

Further according to the present invention, S/N ratio of signal transmission can be improved by covering side surfaces of the first light emitter and the second light emitter with covers formed of a light shielding material, to narrow down the light beams emitting from the first light emitter and the second light emitter to make the light beams direct only to their respective directions to which the light beams are to be directed.

Positioning of the light emitters and the light receivers, and setting of light axes of the light emitters, can be made easily by placing the light emitters and the light receivers in the cases defining positions and orientations of the light emitters and the light receivers.

S/N ratio of signal transmission can further be improved by forming the cases with light shielding material to suppress unnecessary lights emitting from the light emitters and entering into the light receivers.

Power supply and signal transmitting and receiving, through a rotary mechanism, of high reliability can be realized by attaching the rotary light coupler of the present invention to an end portion of a shaft on which slip rings for power supply are provided, in which power supply is made by a contact type device comprising slip rings and brushes, whereas signal transmission and receiving are made by non-contact type rotary light coupler.

Further, power supply and signal transmission and receiving, through a rotary mechanism, of high reliability can be realized by attaching the rotary light coupler of the present invention to an end portion of a shaft on which a rotary transformer for power supply is provided, in which power supply and signal transmission and receiving can be made by non-contact type devices.

DETAILED DESCRIPTION OF THE INVENTION

Figure 1:
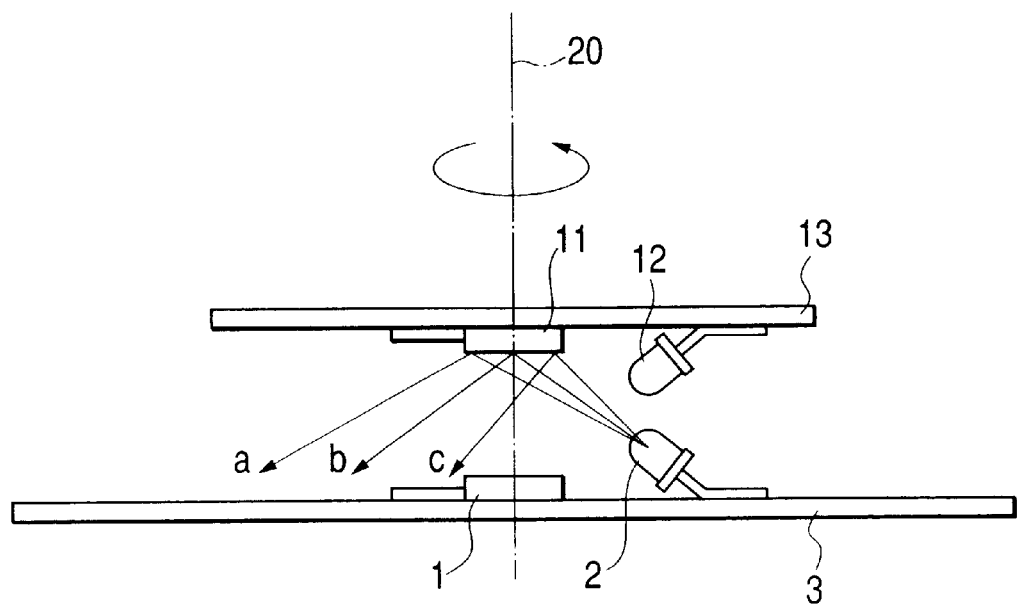
FIG. 1 is a schematic side view showing a rotary light coupler in accordance with the present invention, in which explanatory diagrams for light, axes of the optical system are shown.

A rotary light coupler in accordance with the present invention will be described referring to the drawings.

FIG. 1 shows schematically an optical system of the rotary light coupler according to the present invention. A first light receiver 1 and a first light emitter 2 are mounted on a printed circuit board 3 attached to a fixed body (not shown). A second light receiver 11 and a second light emitter 12 are mounted on a printed circuit board 13 attached to a rotary body (not shown). The printed circuit board 13 is rotatably supported by bearings (not shown) so that it can be rotated around an axis of rotation 20. The first light receiver 1 and the second light receiver 11 are placed opposing each other along the direction of the axis of rotation 20. The first light emitter 2 and the second light emitter 12 are placed respectively at the radially outside of the first light receiver and the second light receiver 11. A light axis of the first light emitter 2 is set in such a manner that it is directed toward the central portion of the second light receiver 11 and that a reflected light from the second light receiver 11 does not enter into the first light receiver 1. Also, a light axis of the second light emitter 12 is set in such a manner that it is directed toward the central portion of the first light receiver 1 and that a reflected light from the first light receiver 1 does not enter into the second light receiver 11. This situation is illustrated in FIG. 1. That is, each light beam transmitted from the first light emitter 2 to the farthest, central or nearest portion of the second light receiver 11, is reflected respectively as indicated by a, b or c. The light axis of the first light emitter 2 is set in such a manner that the reflected light beam as indicated by c does not enter into the first light receiver 1. Further, a set of the first light receiver 1 and the first light emitter 2 and a set of the second light receiver 11 and the second light emitter 12 are placed in such a manner that they do not mechanically interfere with each other when they rotate relatively with each other.

Figure 2:
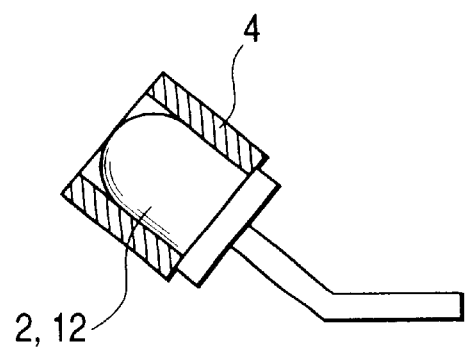
FIG. 2 is a cross sectional view showing a cover for suppressing unnecessary emission of a light beam from a light emitter.

In fact, a light reflected by a part other than the light receivers can not be ignored. So, it is preferable to use a light emitter with a narrow light spread angle, so that the light beam emitted from the first light emitter 2 does not come onto the first light receiver 1 and that the light beam emitted from the second light emitter 12 does not come onto the second light receiver 11. Actually, light beams emitted from the light emitters diffuse with a certain diffusing angle and it is difficult to narrow down the diffusing angle into a desirable range. If an unintentional light caused by diffusion enters into a light receiver, a noise is generated. The noise deteriorates S/N ratio of a signal transmission. Accordingly, if the S/N ratio is not in a sufficient level, it is advantageous to limit the light diffusing angle with alternative means. FIG. 2 shows an example of such alternative means. As shown in FIG. 2, side surface of the first light emitter 2, or the second light emitter 12, is covered with a cover 4 formed of a light shielding material to narrow down the light beam emitting from the first light emitter 2, or the second light emitter 12, so that the light beam can be directed only to the direction of the light receiver to which the light beam is to be directed.

Figure 3:
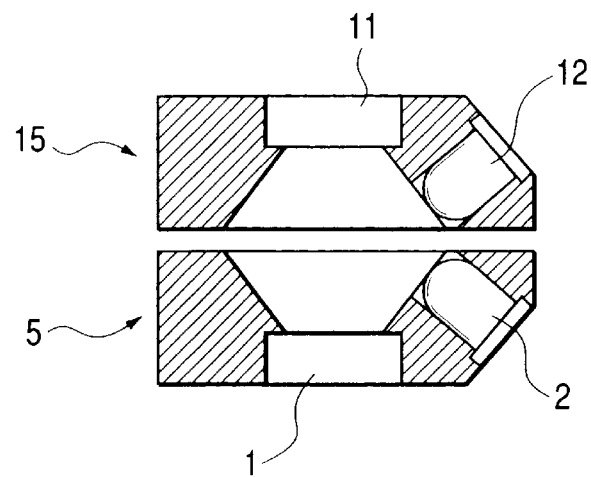
FIG. 3 is a cross sectional view showing cases for mounting light receivers and light emitters in their respective correct positions keeping light axes of the light emitters in the correct direction, and for suppressing unnecessary lights emitting from the light emitters and entering into the light receivers.

It is somewhat difficult to mount light receivers and light emitters in their correct positions keeping light axes of the light emitters in their correct directions. FIG. 3 shows cases for making the mounting of the light receivers and the light emitters easier. The first light emitter 2 and the first light receiver 1 are placed in a first case 5 in which positions and orientations of the first light emitter 2 and the first light receiver 1 are defined. Also, the second light emitter 12 and the second light receiver 11 are placed in a second case 15 in which positions and orientations of the second light emitter 12 and the second light receiver 11 are defined. Then, the first case 5 and the second case 15 are placed to oppose each other. Preferably, the first case 5 and the second case 15 are formed of a light shielding material to narrow down the light beam emitting from the first light emitter 2 and the second light emitter 12, and to suppress unnecessary lights entering into the first light receiver 1 and the second light receiver 11.

Figure 4:
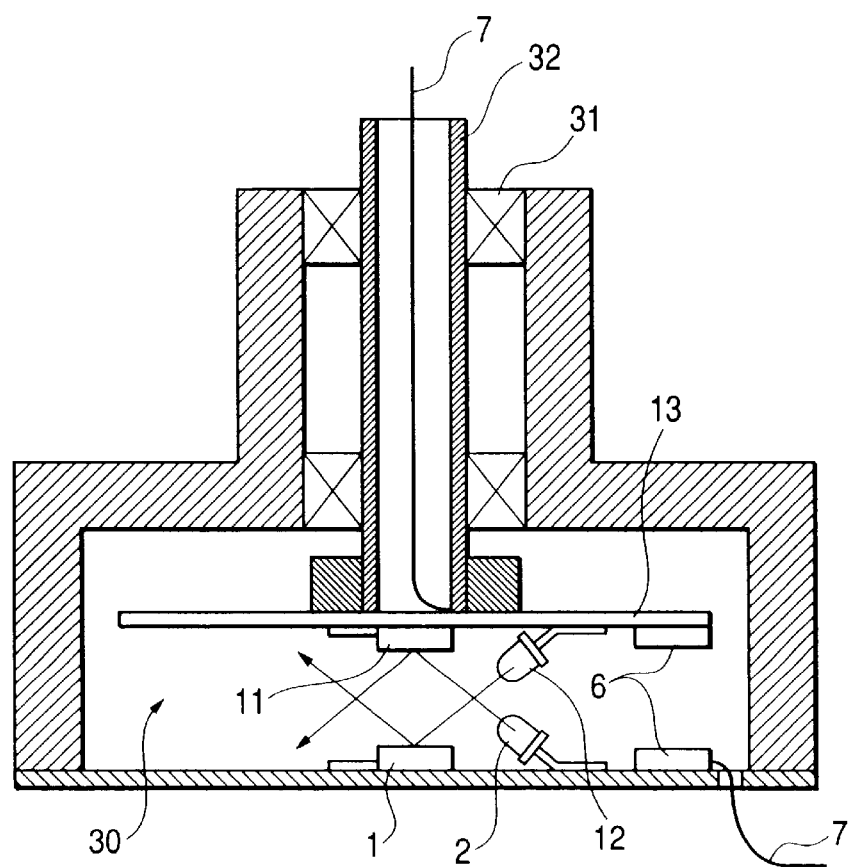
FIG. 4 is a cross sectional view showing the rotary light coupler attached to an end portion of a shaft of a rotary body.

FIG. 4 shows a rotary light coupler 30 attached to an end portion of a shaft 32 of a rotary body. As shown, a printed circuit board 13 is attached to an end portion of a shaft 32 rotatably supported by bearings 31. In this arrangement, signals can be transmitted from the first light emitter 2 mounted on the fixed body to the second light receiver 11 mounted on the printed circuit board 13, or from the second light emitter 12 mounted on the printed circuit board 13 to the first light receiver 1 mounted on the fixed body, through optical communication. A set of the first light receiver 1 and the first light emitter 2 and a set of the second light receiver 11 and the second light emitter 12 are disposed in such a manner that they do not contact mechanically with each other when the latter rotates relatively to the former. Since light beams emitted from the first light emitter 2 and the second light emitter 12 are always directed toward the central portions of the respective light receivers to which the signals are to be transmitted, the signals can be transmitted irrespective of the rotation Transmission and receiving signals treatment circuits 6 are mounted respectively on the printed circuit board 13 and the printed circuit board of the fixed body. A bi-directional transmission is made through input and output wires 7.

Figure 5:
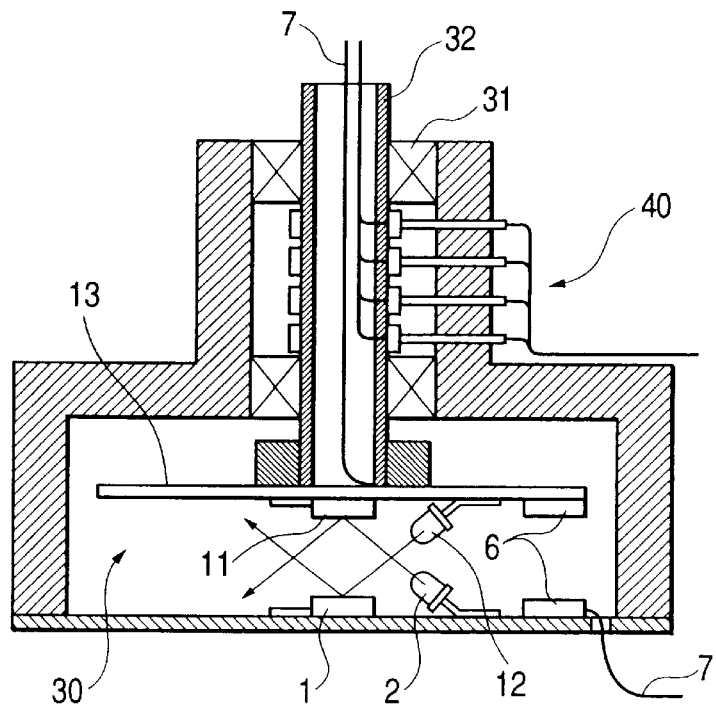
FIG. 5 is a cross sectional view showing the rotary light coupler attached to an end portion of a shaft on which slip rings for power supply are provided.
Figure 6:
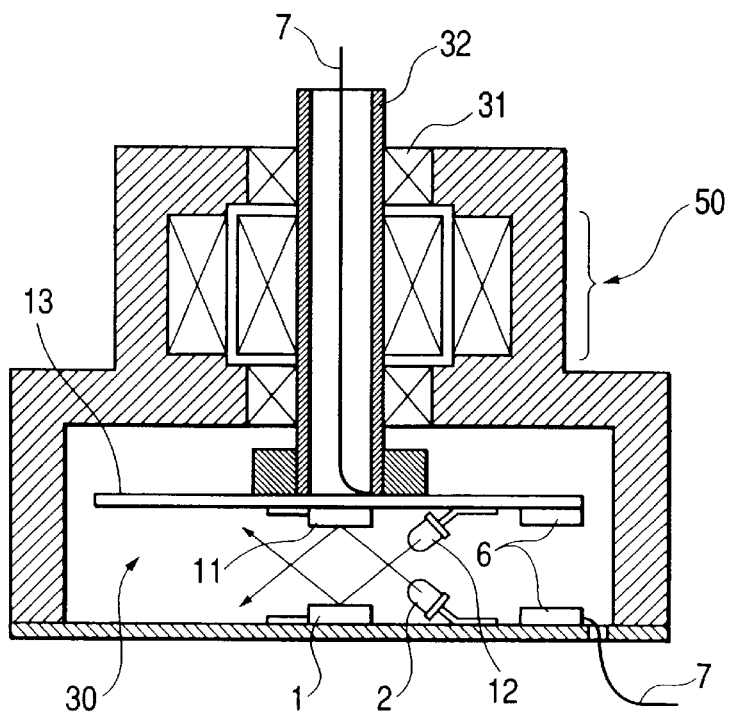
FIG. 6 is a cross sectional view showing the rotary light coupler attached to an end portion of a shaft on which a rotary transformer for non-contact power supply is provided.

FIG. 5 shows a cross sectional view of the rotary light coupler attached to an end portion of a shaft on which slip rings for power supply are provided. As shown, a printed circuit board 13 is attached to an end portion of a shaft 32 on which conventional slip rings 40 are provided. In this arrangement, power is supplied through a contact type power supply device comprising slip rings and brushes, whereas signals are transmitted through non-contact type transmission and receiving device comprising the rotary light coupler in accordance with the present invention FIG. 6 shows a cross sectional view of the rotary light coupler attached to an end portion of a shaft on which a rotary transformer for non-contact power supply is provided. As shown, a printed circuit board 13 is attached to an end portion of a shaft 32 of a non-contact type power supply device 50 utilizing a rotary transformer. In this arrangement, power supply and signal transmission and receiving are made through non-contact type devices.

According to the rotary light coupler of the present invention, a non-contact type bi-directional transmission can be realized by the optical system of very simple structure without using a complicated optical system comprising lenses, mirrors, prisms and/or the like.

Also according to the rotary light coupler of the present invention, S/N ratio of signal transmission can be improved by suppressing unnecessary lights emitting from the light emitters by covering side surfaces of the light emitters with the covers formed of a light shielding material.

Further according to the rotary light coupler of the present invention, the positioning and orientation of the light emitter and the light receiver can be made easily by placing the light emitter and the light-receiver in the case in which positions and orientations of the light emitter and the light receiver are respectively defined. Further, S/N ratio of signal transmission can be further improved by forming the case with a light shielding material that enables suppression of unnecessary lights emitting from the light emitters and entering into the light receivers.

Further according to the rotary light coupler of the present invention, reliability of signal transmission, as well as reliability and life span of a device which requires power supply and signal transmission through a rotary mechanism, can be improved, by attaching the rotary light coupler for signal transmission to an end portion of a shaft to which slip rings for power supply are attached.

Further according to the rotary light coupler of the present invention, reliability of signal transmission and power supply, as well as reliability and life span of a device, can be further improved, by attaching the rotary light coupler for signal transmission to an end portion of a shaft of non-contact type power supply device utilizing a rotary transformer, thus making both power supply and signal transmission devices non-contact type.

What is claimed is:

1. A rotary light coupler assembly comprising:

a first light emitter and a first light receiver mounted on a fixed body;

a second light emitter and a second light receiver mounted on a rotary body; said first light emitter being arranged to transmit a light beam containing signals to said second light receiver through a rotary mechanism, said second light emitter being arranged to transmit a second light beam containing signals to said first light receiver through said rotary mechanism; said first light receiver and said second light receiver being placed opposing each other along a direction of an axis of rotation of said rotary body; said first light emitter and said second light emitter being aligned respectively at a radial edge of said first light receiver and said second light receiver;

a light axis of said first light emitter being set in such a manner that said light axis of said first light emitter is directed toward a central portion of said second light receiver and that a reflected light from said second light receiver does not enter into said first light receiver;

a light axis of said second light emitter being set in such a manner that said light axis of said second light emitter is directed toward a central portion of said first light receiver and that a reflected light from said first light receiver does not enter into said second light receiver; and a set of said first light receiver and said first light emitter and a set of said second light receiver and said second light emitter being disposed in such a manner that they do not mechanically interfere with each other when they rotate relatively with each other; wherein the rotary light coupler is attached to an end portion of a shaft on which a power supply is provided.

2. The rotary light coupler assembly according to claim 1, wherein side surfaces of said first emitter and said second emitter are respectively covered with covers formed of light shielding material, to narrow down said light beams emitting from said first emitter and said second emitter to make said light beams direct only to the respective directions to which said light beams are to be directed.

3. The rotary light coupler assembly according to claim 1, wherein said first light emitter and said first light receiver are placed in a first case defining positions and orientations of said first light emitter and said first light receiver, and suppressing unnecessary lights emitting from said first light emitter and entering into said first light receiver; said second light emitter and said second light receiver are placed in a second case defining positions and orientations of said second light emitter and said second light receiver, and suppressing unnecessary lights emitting from said second light emitter and entering into said second light receiver; and said first case and said second case are placed to oppose each other.

4. A rotary light coupler assembly for signal transmission and receiving, wherein the rotary light coupler according to claim 1 is attached to said end portion of said shaft on which slip rings for said power supply are provided.

5. A rotary light coupler assembly for signal transmission and receiving, wherein the rotary light coupler according to claim 2 is attached to said end portion of said shaft on which slip rings for said power supply are provided.

6. A rotary light coupler assembly for signal transmission and receiving, wherein the rotary light coupler according to claim 3 is attached to said end portion of said shaft on which slip rings for said power supply are provided.

7. A rotary light coupler assembly for signal transmission and receiving, wherein the rotary light coupler according to claim 1 is attached to said end portion of said shaft on which a rotary transformer for non-contact power supply is provided.

8. A rotary light coupler assembly for signal transmission and receiving, wherein the rotary light coupler according to claim 2 is attached to said end portion of said shaft on which a rotary transformer for non-contact power supply is provided.

9. A rotary light coupler assembly for signal transmission and receiving, wherein the rotary light coupler according to claim 3 is attached to said end portion of said shaft on which a rotary transformer for non-contact power supply is provided.

* * * * *